United States Patent [19]
Johnson et al.

[11] Patent Number: 5,458,350
[45] Date of Patent: Oct. 17, 1995

[54] RECYCLE COLLECTOR DOLLY

[76] Inventors: James I. Johnson, 7407 Riverdale Rd., Lanham, Md. 20706; Marcell R. Johnson, 120 Duvall La., Gaithersburg, Md. 20877

[21] Appl. No.: 273,177

[22] Filed: Jul. 26, 1994

[51] Int. Cl.[6] ........................... B62B 1/04
[52] U.S. Cl. ............... 280/47.26; 280/79.5; 220/410; 220/676; 220/909; D12/424; D34/19; D34/23; D34/25
[58] Field of Search .................. 280/47.131, 47.17, 280/47.19, 47.2, 47.24, 47.26, 79.5, 79.6, 79.3, 79.11; 220/402, 410, 505, 521, 529, 554, 676, 908, 909; D34/1, 12, 19, 20, 21, 23, 24, 25, 27; D12/423, 424, 425; 209/930

[56] References Cited

U.S. PATENT DOCUMENTS

| D. 299,578 | 1/1989 | Wilson | D34/25 |
|---|---|---|---|
| D. 330,956 | 11/1992 | Severino | D34/1 |
| 4,821,903 | 4/1989 | Hayes | 280/47.26 |
| 4,887,837 | 12/1989 | Bonewicz et al. | 280/47.26 |
| 4,984,704 | 1/1991 | O'Malley | 220/909 |
| 5,072,576 | 12/1991 | Evans | D34/1 |
| 5,108,000 | 4/1992 | Stoll et al. | 220/23.4 |
| 5,111,958 | 5/1992 | Witthoeft | 220/524 |
| 5,129,543 | 7/1992 | White | 220/503 |
| 5,170,903 | 12/1992 | Fleming | 202/909 |
| 5,184,744 | 2/1993 | Paulison | 220/23.4 |
| 5,244,218 | 9/1993 | Irwin, Sr. | 280/47.19 |
| 5,284,268 | 2/1994 | Marsan et al. | 220/23.83 |
| 5,303,841 | 4/1994 | Mezey | 220/555 |

FOREIGN PATENT DOCUMENTS

| 2248381 | 4/1992 | United Kingdom . |
|---|---|---|
| 2252898 | 8/1992 | United Kingdom . |

*Primary Examiner*—Anne Marie Boehler
*Attorney, Agent, or Firm*—Richard C. Litman

[57] ABSTRACT

A lightweight compartmentalized collector dolly which readily stores newspapers, glass and metal materials for recycling is disclosed. The newspapers can be neatly stacked and bundled within a dedicated compartment. The collector dolly has a handle and wheels to enable even a child to maneuver the dolly and to collect recyclable materials and sort them during collection. Another container for storing glass materials hangs from a handle support bar and is supported by a half-cup at the bottom. Since the doubled cylindrical compartments have liners and both compartments and liners have draining capabilities at their bottoms, the storing regions in this dolly can be readily cleaned.

18 Claims, 4 Drawing Sheets

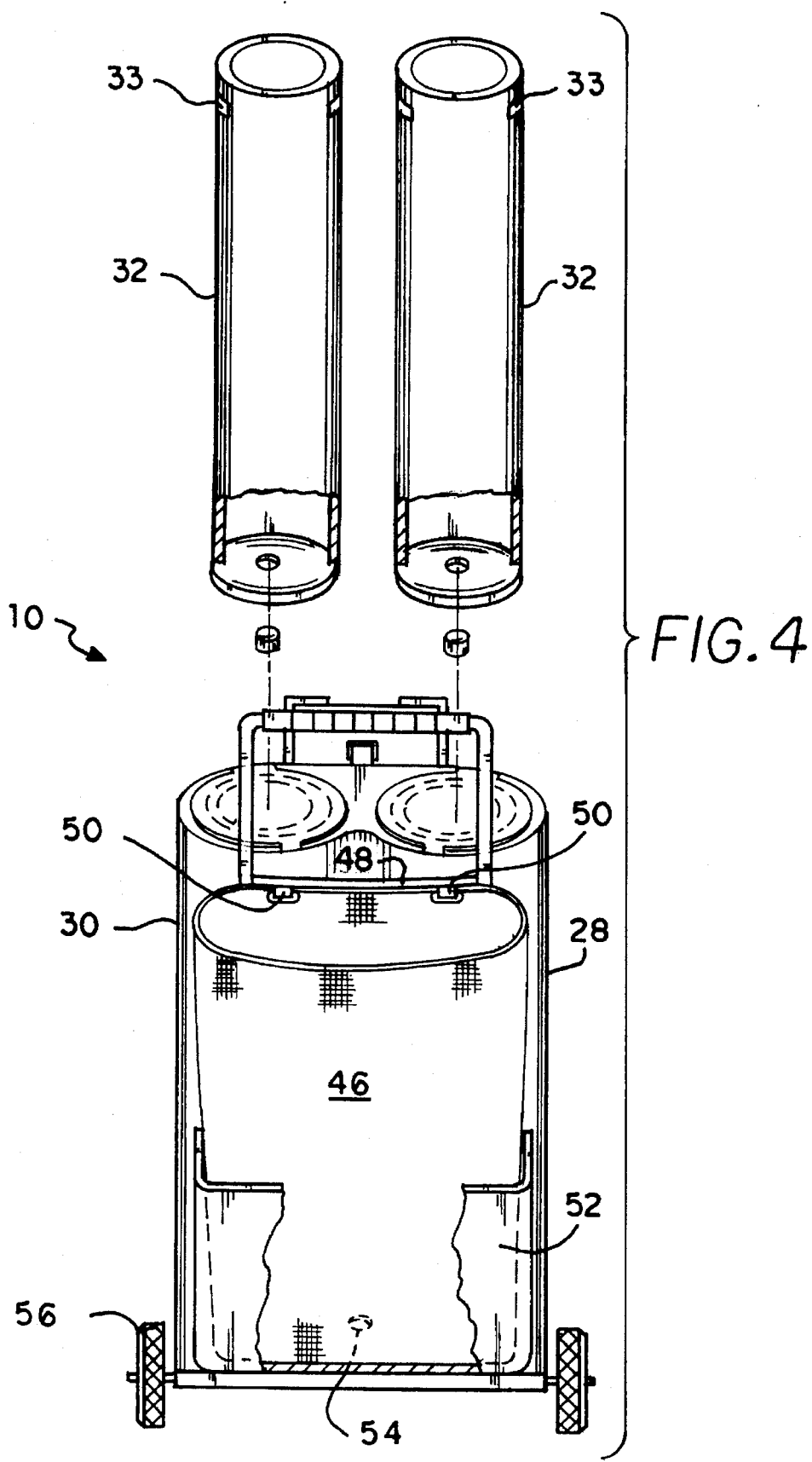

5,458,350

RECYCLE COLLECTOR DOLLY

BACKGROUND OF THE INVENTION

1. Field of the Invention

The present invention relates to a collector dolly operable by a child for efficiently collecting and sorting recyclable materials such as newspapers, aluminum materials and glass/plastic containers in separate bins.

2. Description of the Prior Art

Many communities now require recycling of newspapers, glass, aluminum, and plastic containers. Those public-spirited people who conscientiously collect these recyclable materials in their neighborhood must resort to the use of heavy rudimentary collection containers lacking separate compartments for collecting such materials.

A number of patents have been issued that address the collection of recycling materials. These patents will be discussed in the order of their perceived relevance to the claimed invention In U.S. Pat. No. 5,303,841 issued on Apr. 19, 1994 to Armand G. Mezey and U.S. Pat. No. 5,244,218 issued on September to John C. Irwin, Sr., bulky waste collection systems consisting of a wheeled and handled container to receive various recyclable materials in internal compartments are disclosed. The compartmentalized containers are designed to cooperate with a route collection vehicle to enable mechanized loading and emptying of the container by the vehicle. There is no suggestion of a smaller wheeled container that even a child can operate and unload newspapers stacked by the convenience of a slot as in the present recycle collector dolly.

In U.S. Pat. No. 5,108,000 issued on Apr. 28, 1992 to Mark S. Stoll et al. and U.S. Pat. No. 5,184,744 issued on Feb. 9, 1993 to James H. Paulison, caddy or add-on containers for hanging on a wastebasket for collection of recyclable paper or trash are disclosed. There are no provisions for a handle, wheels and an adequate area and a slot enabling the neat piling and picking up of the newspapers for bundling.

In U.S. Pat. No. 5,111,958 issued on May 12, 1992 to Carol A. Witthoeft and U.S. Pat. No. 5,129,543 issued on Jul. 14, 1992, a household compartmentalized refuse collection container is disclosed which contains several rigid receptacles and in Witthoeft even a space for a plastic bag. Again, there are no handles, wheels and a newspaper stacking unit.

In U.K. Patent Application No. 2,248,381 A published on Aug. 4, 1992 for Michael Kelly et al., a household waste container for storing recyclable materials having four compartments with a handle and wheels is disclosed. Kelly et al. also disclose a stopper on the bottom and in front of their wheeled container. However, there is no provision for neat stacking and retrieval of the newspapers collected in these disclosures.

Finally, in U.S. Pat. No. 5,284,268 issued on Feb. 8, 1994 to Norman Marsan et al. and U.K. Patent Application No. 2,252,898 A published on Aug. 26, 1992 for Paul Pelowski et al., compartmentalized recyclable waste containers having removable containers are disclosed. Provision for stacking of newspapers is neither suggested nor taught.

None of the above inventions and patents, taken either singly or in combination, is seen to describe the instant invention as claimed.

SUMMARY OF THE INVENTION

The present invention is a light-weight recyclable materials collector dolly or cart having two cylindrical receptacles integrated with a rectangular slotted receptacle in front. A removable plastic net bin for glass material hangs from a back handle and is supported on the bottom by a half-cup integrated with the collector unit. On the bottom of this dolly or cart, wheels are located in the rear with a stopper projection or support leg in front for stability. The cylindrical receptacles have lids and removable drain plugs at the bottom for cleaning purposes. In addition, the cylindrical receptacles have open liners with removable drain plugs. The rectangular receptacle is adapted to receive a stack of newspapers which can be readily be bundled by the provision of a slot in front. The rectangular receptacle has a floating lid which slides vertically to hold the newspapers down by attachment to a vertical bar situated at the rear of the paper bin. The rectangular lid can be swiveled back at the uppermost position for adding or accessing the newspapers. There is provision for a ball of twine to be retained on a post positioned within a depression on top of the dolly and behind the paper bin. In order to utilize the twine to bundle a reasonable stack of newspapers, a hole is provided in the rear of the newspaper bin to access the twine.

Accordingly, it is a principal object of the invention to provide a lightweight recyclable materials collector dolly or cart with four integrated compartments to collect newspapers and glass or metal containers. The dolly or cart has a rear handle, two rear wheels and a front stopper projection or support leg on the bottom.

It is another object of the invention to provide a rectangular bin having a floating lid for stacking and bundling newspapers by virtue of an integrated source of bundling material.

It is a further object of the invention to provide two cylindrical bins with drainage plugs holding cylindrical liners with drainage plugs to enhance the cleaning thereof. Each cylindrical bin has a hinged cover.

Still another object of the invention is to provide a removable bin for glass which hangs from the handle and is supported at the bottom by a half-cup integrated with the cylindrical bins.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is an exploded rear perspective view of the recycle collector dolly illustrating the bottom drainage stoppers and a broken view of the half-cup support showing its drainage hole.

Similar reference characters denote corresponding features consistently throughout the attached drawings.

DETAILED DESCRIPTION OF THE PREFERRED EMBODIMENT

Figure 1:
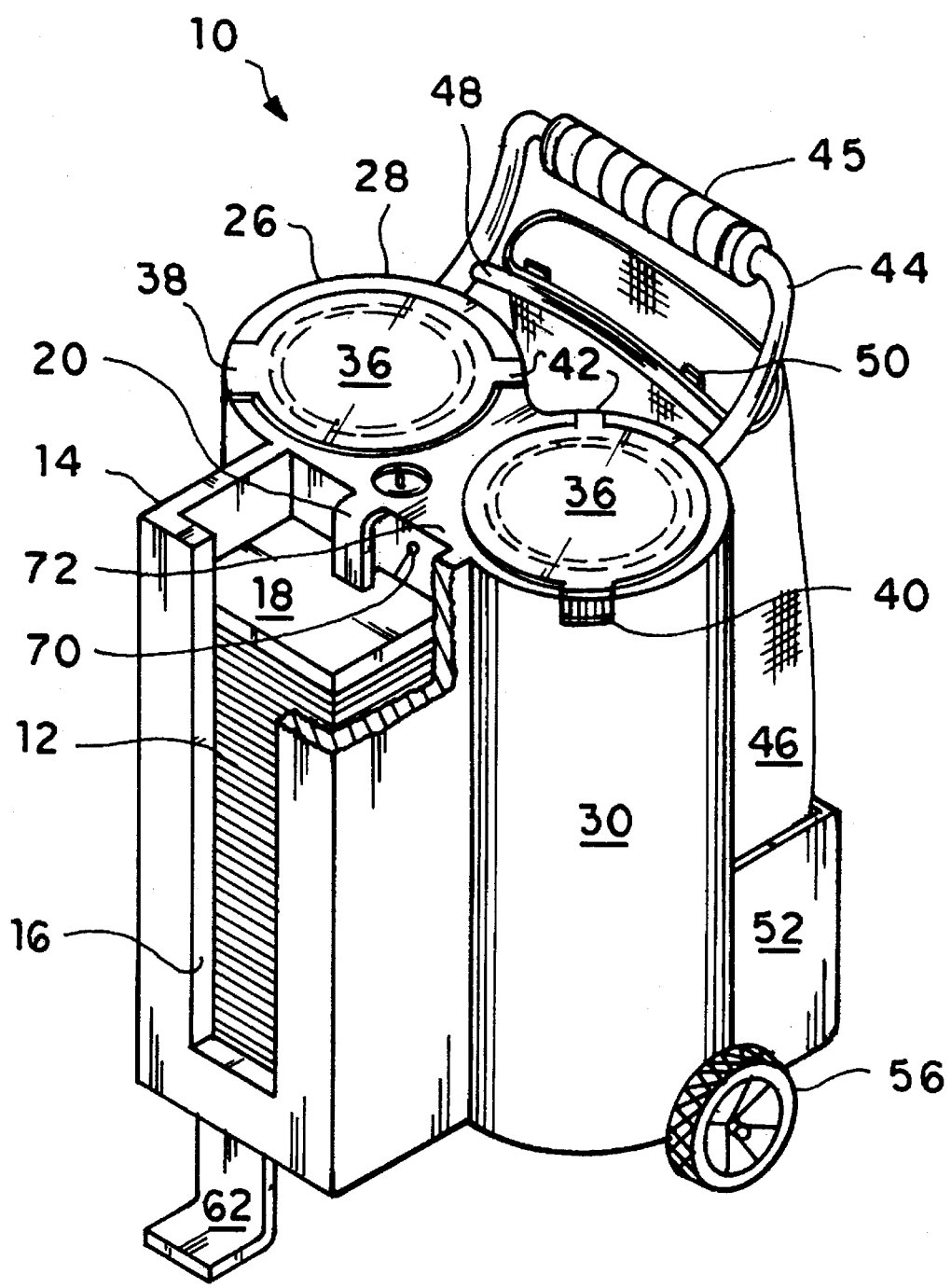
FIG. 1 is environmental perspective view of the recycle collector dolly loaded with newspapers with a breakaway portion to show the floating lid.
Figure 3:
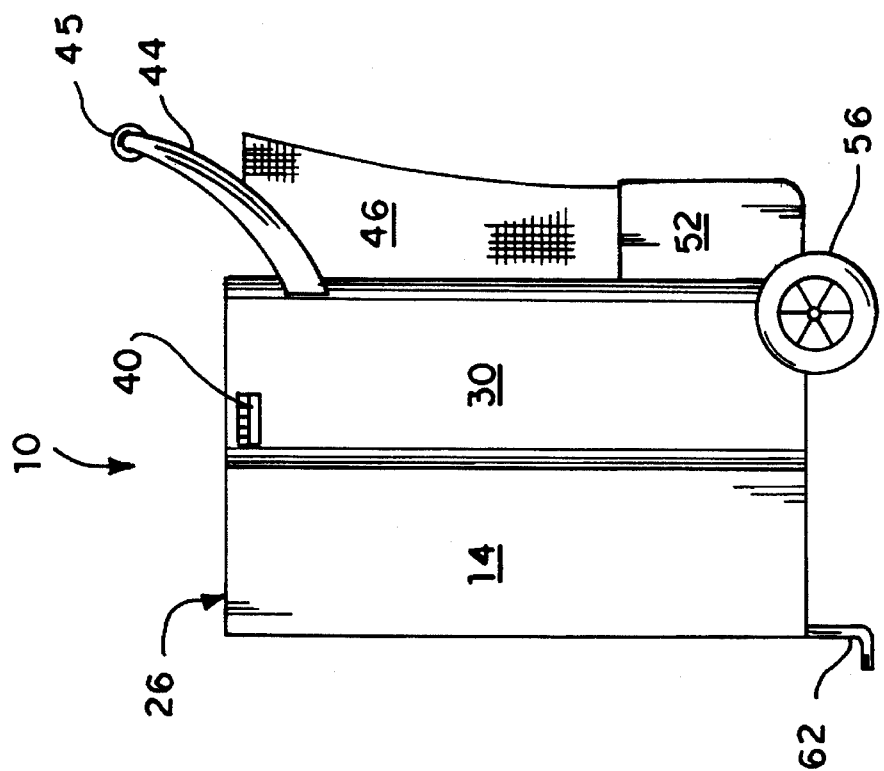
FIG. 3 is a right side elevational view of the recycle collector dolly.
Figure 2:
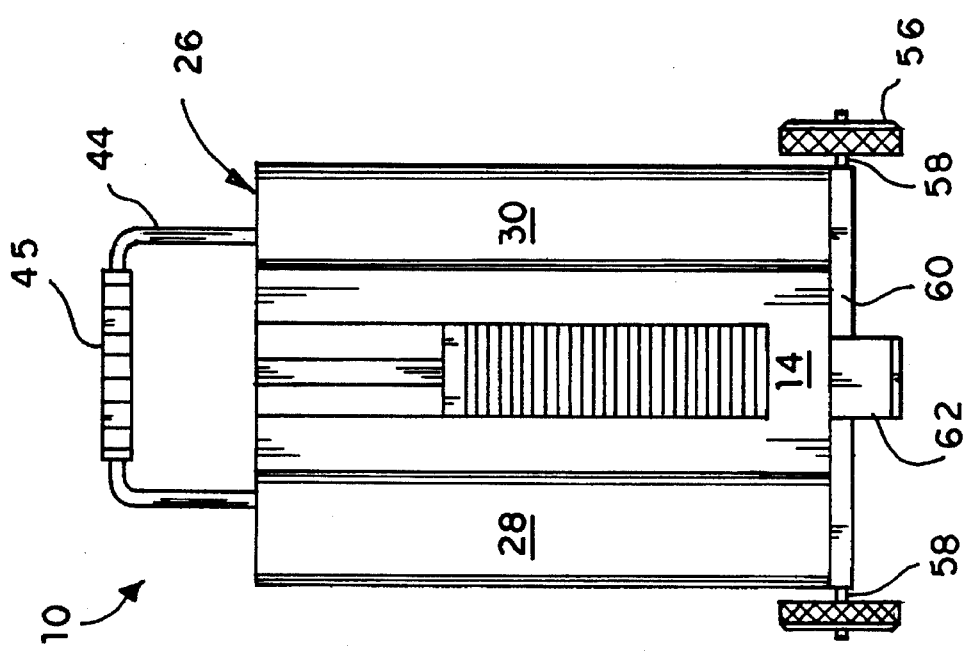
FIG. 2 is a front elevational of the recycle collector dolly.
Figure 6:
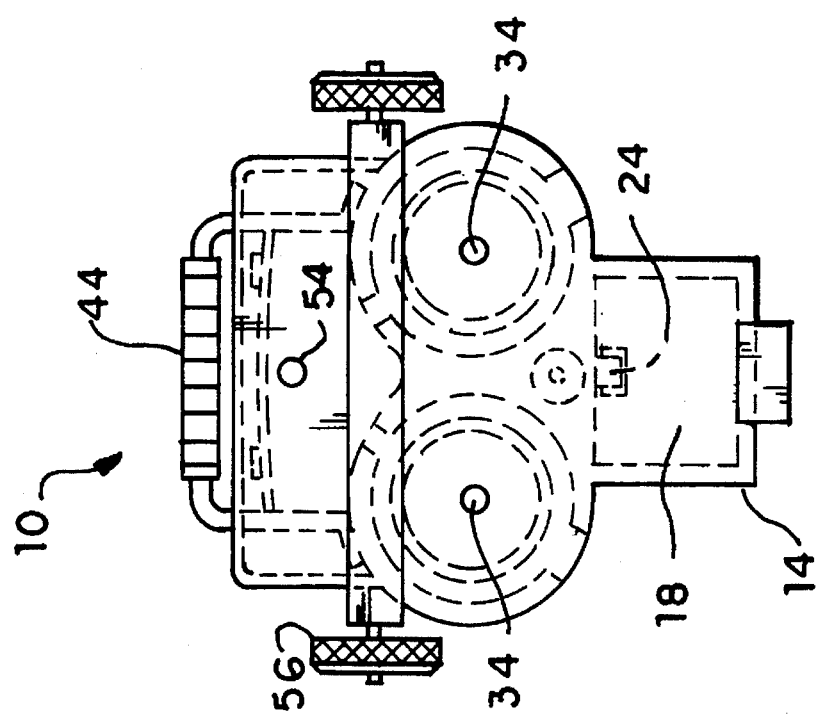
FIG. 6 is a bottom plan view of the recycle collector dolly showing the positions of the stopper or support leg and wheels.
Figure 5:
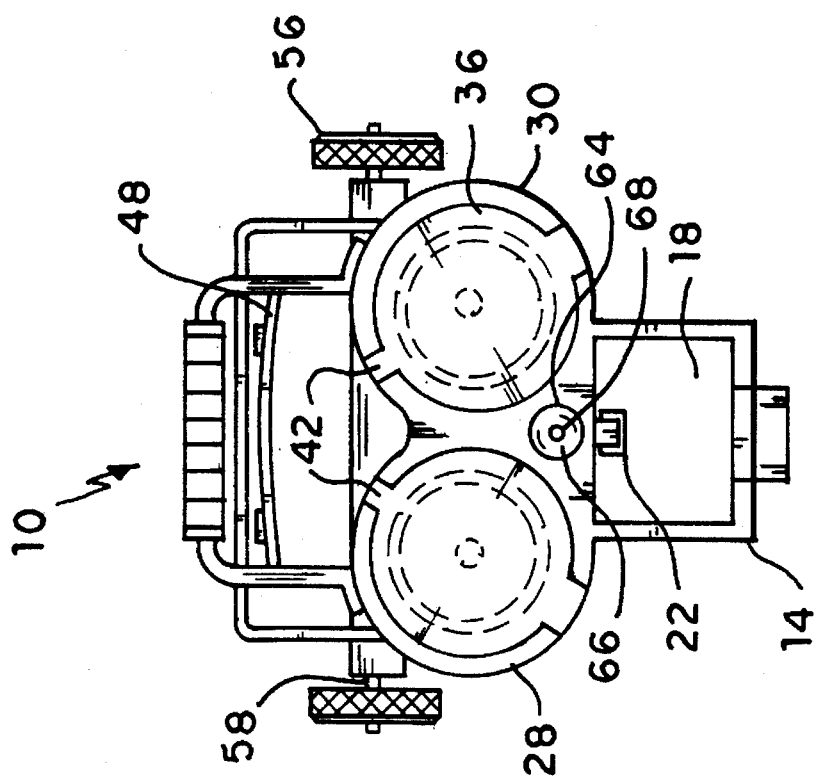
FIG. 5 is a top plan view of the recycle collector dolly with all the covers closed.

The present invention is illustrated in FIGS. 1–6, wherein the recycle collector dolly or cart 10 is shown loaded with newspapers 12 in the rectangular shaped newspaper bin 14 having a slot 16 and a rectangular shaped movable lid 18. Lid 18 slides up and down on the vertical lid retainer strap 20 by means of the retainer ring 22 (FIG. 5). The retainer ring 22 has a separation 24 (FIG. 6) in the back or on one side (not shown) in order to attach lid 18 to or remove it from the vertical strap 20. Lid 18 can be conveniently positioned on the top surface 26 of the dolly 10 at the uppermost position on retainer strap 20 by laying back over the cylindrical containers 28, 30.

The joined cylindrical containers 28, 30 are preferably plastic with plastic liners 32 and covers 36. These containers and liners are cylindrical in order to maximize their continued integrity. In addition, the cylindrical containers 28, 30 are integrated with the newspaper bin 14 to reinforce each compartment. The containers 28, 30 are provided to store separately, for example, plastic and aluminum containers, which are kept separate from glass containers. These containers 28, 30 are the same height as the newspaper bin 14. Each container 28, 30 and each liner 32 has a bottom drainage plug 34 (FIG. 6) to permit cleaning. Liners 32 are utilized in order to facilitate the removal of the stored materials from the joined cylindrical containers 28, 30. Liners 32 have diametrically opposed grasping holes 33 (FIG. 4) in order to facilitate removal from the cylindrical containers 28, 30. Container covers 36 are flush with the top surface 26 and have ears 38 which are accessed by the depression or cutout 40 (FIG. 3) in the top surface 26 of cylindrical containers 28, 30. Hinges 42 for covers 34 are located diametrically opposite to the ears 38. These hinge positions enable the covers 36 to open up towards the handle 44 instead of out on the side of the dolly 10. Handle 44 is located proximate the top surface 26 and to the rear of both cylindrical containers 28, 30. Handle 44 has a thickened central portion 45 including circumferential grooving to enhance a user's handgrip. Glass bin container 46 is formed from plastic to retain any broken pieces of glass. Container 46 hangs from a handle support bar 48 which has at least two hooks 50. Container 46 is supported on the bottom by a solid plastic half-cup support 52. Half-cup support 52 has a bottom drain 54 (FIGS. 4 and 6) which can be plugged or left open. In the event of inclement weather, rain water would not accumulate in the half-cup support when bottom drain 54 is left open. Handle 44 and handle support bar 48 increase the structural integrity of the dolly or cart 10. Handle 44 can be shortened in height for production purposes and molded with the remaining structure.

A depression 64 (FIG. 5) is formed on the top surface 26 in the region between the two joined cylindrical containers 28, 30 and the newspaper bin 14 to hold a ball of twine or string 66 on a centrally located post 68 (FIG. 5). The depression 64 may be covered with a hinged or unhinged lid (not shown). A passageway 70 (FIG. 1) is provided in the wall 72 between the depression 64 and the newspaper bin 14 in order to pass the twine or string into the region of the newspapers. Therefore, an operator can at his or her convenience, bundle the newspapers from the top down or from the bottom up as the newspapers are collected. The floating lid 18 acts as a compactor during the piling of the newspapers. The bin lid 20 can have the lid retainer ring 24 located on its short side along with the lid retainer strap 20 (not shown). Furthermore, the slot 16 can be positioned on a short side of the newspaper bin 14 (not shown). The slot 16 should be of sufficient width to enable a user to insert his or her arm in order to bundle the newspapers.

Two plastic or rubber wheels 56 are connected by separate axles 58 to block 60 (FIG. 2) located underneath the cylindrical containers 28, 30. Block 60 adds to the structural integrity of this unit. Underneath the newspaper bin 14, stopper or support leg 62 is centrally located to balance the dolly or cart 10. The length of the stopper or support leg 62 is of sufficient length to maintain the dolly or cart 10 preferably in a substantially vertical standing position, but can be lengthened to maintain a slightly inclined position of the dolly or cart 10 to the rear in order to counteract the weight of a fully loaded newspaper compartment.

As an alternative, the cylindrical containers 28, 30 and the included liners receptacles 32 depicted in FIGS. 1–6 can have a smaller diameter at the bottom with the consonant changes in the dimensions of the spacing between the wheels 56 (not shown).

Illustrative dimensions for the dolly or cart 10 are as follows: The height of newspaper bin 14 and cylindrical containers 28, 30 is 33 in.. The rectangular bin 14 is 15 in. wide and 13 in. deep. The slot 16 should be at least 4 ½ in. wide. The cylindrical containers 28, 30 have an outside circumference of 46 in. The liners 32 have an outside diameter of 44 in.. The width of the two joined cylindrical containers 28, 30 is approximately 29 in.. The bottoms of these cylindrical containers can have a slightly smaller diameter than the tops in a second embodiment (not shown) as noted above. Consequently, the liners 32 will also conform to this shape. The half-cup support 52 is 29 in. wide, 12 in. high and extends out 29 in.. The removable plastic container 46 for glass material is 20 in. tall, 28 in. wide and extends out approximately 8 in.

It is to be understood that the present invention is not limited to the sole embodiment described above, but encompasses any and all embodiments within the scope of the following claims.

I claim:

1. A recycle collector dolly comprising a unitized structure having two separate but joined containers, a bin situated adjacent to said joined containers, said bin having means defining a slot extending from the top to proximate the bottom and having a floating lid, means defining a depression for containing a ball of twine, said depression situated on said dolly between said bin and said joined containers, a handle situated at the rear of said joined containers with attachment to each said container proximate to the top surface thereof, a handle support bar bridging said handle at each point of attachment to said joined containers, a removable non-cylindrical container open at its top, attachable to said handle support bar and supported by a half-cup support situated proximate the bottom of said containers, two wheels situated at the bottom of and proximate the outside edges of said containers, and a stopper situated at the bottom and proximate the front of said dolly, whereby newspapers can be stacked in the bin, glass materials can be stored in the removable non-cylindrical container, and plastic and metal materials can be stored in said separate containers.

2. The recycle collector dolly according to claim 1, wherein each said joined container has a liner having diametrically opposed grasping holes.

3. The recycle collector dolly according to claim 2, wherein each said liner and each said joined container has a removable drainage plug at a bottom thereof.

4. The recycle collector dolly according to claim 1, wherein said bin is rectangular and situated in front of said joined containers.

5. The recycle collector dolly according to claim 1, further comprising a retainer strap for removably attaching said floating lid to said bin.

6. The recycle collector dolly according to claim 5, wherein said retainer strap is situated at the rear of said bin.

7. The recycle collector dolly according to claim 1, wherein each said joined container has a hinged lid with an ear.

8. The recycle collector dolly according to claim 1, wherein the half-cup support has means defining an open drainage hole located at its bottom.

9. The recycle collector dolly according to claim 1, further comprising means defining a passageway situated between said bin and the depression, whereby twine can be accessed through said passageway in order to bundle said newspapers.

10. The recycle collector dolly according to claim 1, further comprising at least two handle hooks situated on the handle bar, whereby the non-cylindrical container can be engaged at its top edge by said hooks.

11. The recycle collector dolly according to claim 1, wherein said unitized structure is substantially made from plastic.

12. A recycle collector dolly according to claim 1, wherein said slot is situated in front of said bin.

13. A recycle collector dolly according to claim 1, wherein said depression contains a ball of string maintained on a post.

14. A recycle collector dolly according to claim 1, wherein said half-cup support is situated at the rear of said joined containers.

15. A recycle collector dolly according to claim 1, wherein said joined containers are cylindrical.

16. A recycle collector dolly according to claim 15, wherein said joined cylindrical containers are wider at the top than at the bottom.

17. A recycle collector dolly comprising a unitized structure having two joined cylindrical containers, each said joined cylindrical container containing a liner with diametrically opposed grasping holes and a hinged cover, a rectangular bin situated in front of said cylindrical containers, said bin having a slot situated in front and extending from the top to proximate the bottom and having a floating lid, a depression containing a ball of string situated on a top surface between said bin and said joined cylindrical containers, a handle situated at the rear of said joined cylindrical containers with attachment to each said joined cylindrical container proximate to the top surface thereof, a handle support bar bridging said handle at each point of attachment to said joined cylindrical containers, a removable non-cylindrical container attachable to said handle support bar and supported by a half-cup support situated at the rear of and proximate the bottom of said joined cylindrical containers, said half-cup support having a drainage hole at its bottom, two wheels situated at the bottom of and proximate the outside edges of said joined cylindrical containers, and a support leg situated at the bottom and proximate the front of said rectangular bin, whereby newspapers can be stacked in the rectangular bin, glass materials can be stored in the removable non-cylindrical container, and plastic and metal materials can be stored separately in said joined cylindrical containers.

18. A recycle collector dolly according to claim 17, wherein each said liner and each said joined cylindrical container has a removable drainage plug at a bottom thereof.

* * * * *